United States Patent [19]

Appling

[11] Patent Number: 4,533,418

[45] Date of Patent: Aug. 6, 1985

[54] POLYURETHANE HEAT FORM AND BONDING OF CABLE JACKETS

[75] Inventor: James Appling, Canoga Park, Calif.

[73] Assignee: Allied Corporation, Morristown, N.J.

[21] Appl. No.: 652,932

[22] Filed: Sep. 21, 1984

[51] Int. Cl.³ .............................................. H01B 13/06
[52] U.S. Cl. ........................................ 156/52; 29/858;
156/247; 156/259; 156/344; 174/75 R;
264/272.11; 339/218 R; 339/275 T
[58] Field of Search .................... 29/857, 858; 156/47,
156/48, 52, 344, 584, 259; 174/74 R, 75 R, 84
R; 264/272.11; 339/218 R, 275 C, 275 R, 275
T; 156/247

[56] References Cited

U.S. PATENT DOCUMENTS

| 429,292 | 6/1890 | Thatcher | 156/584 X |
| 1,791,106 | 2/1931 | Slugg | 156/584 X |
| 2,355,545 | 8/1944 | Meyerhans et al. | 174/84 R X |
| 2,894,868 | 7/1959 | Hyde | 156/584 X |
| 4,419,819 | 12/1983 | Dickhudt et al. | 29/857 |

*Primary Examiner*—Robert A. Dawson

*Attorney, Agent, or Firm*—Robert C. Smith; Vett Parsigian

[57] ABSTRACT

A method of bonding a metal termination member including an electrical connector to an electrical cable designed for underwater operation having a plurality of insulated electrical wires, an internal armor layer of spirally wound wires, and a tough polyurethane protective jacket including the steps of splitting the external jacket longitudinally and peeling it away from the remainder of the cable, connecting the electrical wires to the connector member, attaching the wires of the armor layer to the termination member, cleaning and priming the metal surfaces of the termination member and the armor wires with a suitable thermoplastic adhesive which will adhere to metal and to polyurethane, repositioning the split halves of the polyurethane jacket around the end of the cable and the termination member, placing the termination assembly in a mold and subjecting it to heat and pressure sufficient to cause the polyurethane jacket material to flow sufficiently to bond the split halves of the jacket together and to the surface of the termination member, cooling or allowing the assembly to cool and removing the terminated assembly from the mold.

6 Claims, 4 Drawing Figures

POLYURETHANE HEAT FORM AND BONDING OF CABLE JACKETS

This invention relates to a method of bonding a polyurethane cable jacket to a cylindrical metal termination member.

Electrical cables, particularly for operation underwater where pressure differentials become significant, frequently include along with the necessary electrical conductors, suitable insulating material, a tough protective polyurethane jacket and metallic termination members for connection to housings, sensors or other sections of cable. Such cables frequently are exposed to substantial tensile stress and may also include strength members in the form of woven or spirally wound armor wires, usually located in a layer just under the outer protective jacket. The cables are frequently reeled onto and off a drum which imposes crushing stresses and may, more than any other part of the duty cycle, tend to result in deterioration such as separation of the jacket from the termination members or breaking of the armor strands, causing leaks as the broken ends penetrate the jacket.

In the process of manufacturing such cables, the usual procedure is to cut off a length of the protective jacket, attach a metal electrical connector to the conducting wires, fasten a separate external termination member to the electrical connector, if a separate termination member is used, prime the connector or termination member with a metal to polyurethane primer, place the end of the cable and termination member into a mold and inject potting compound to provide electrical insulation and to seal the conductors. The assembly is then retained in the mold for a sufficient time to permit the potting compound to cure. If no heat is added this cure time may take approximately twelve hours. Even with the addition of heat, cure time is several hours. This lengthy cure time adds considerably to the cost of the cable and, of course, ties up the mold for whatever cure time is required. It is also expensive because of the need to use the additional potting compound and because of the process of injecting the potting compound.

The termination method of the present invention is characterized in that the external jacket is split longitudinally into two substantially even halves, the metallic connector or termination member is suitably attached to the remaining portion of the cable, the metal surface of the connector or termination member is cleaned to remove any residual grease or oil and is primed with a thermoplastic adhesive which will adhere to metal and to polyurethane, the split halves of the jacket are repositioned around the cable and over the surface of the connector or termination member and the terminated assembly placed in a mold and subjected to heat and pressure sufficient to cause said polyurethane jacket material to flow sufficiently to cause the split halves to bond to each other and to the surface of the connector or termination member, and allowing the mold and termination assembly to cool to a temperature below about 40 degrees C. before removing it from the mold. The mold is typically heated to a temperature of about 145-150 degrees C. for approximately twenty minutes. Cooling may be expedited by running cooling water through the mold. The entire molding process is accomplished in about one half hour and requires no additional potting material or injection process. When the assembly is removed from the mold, any extra flashing is removed from the polyurethane jacket and the termination is complete.

The principal advantage resulting from the invention is that the termination is accomplished in much less time and the overall cost of effecting the termination and, therefore, of the cable itself, is substantially less. An additional advantage is that no extra potting process or material are required.

Figure 1:
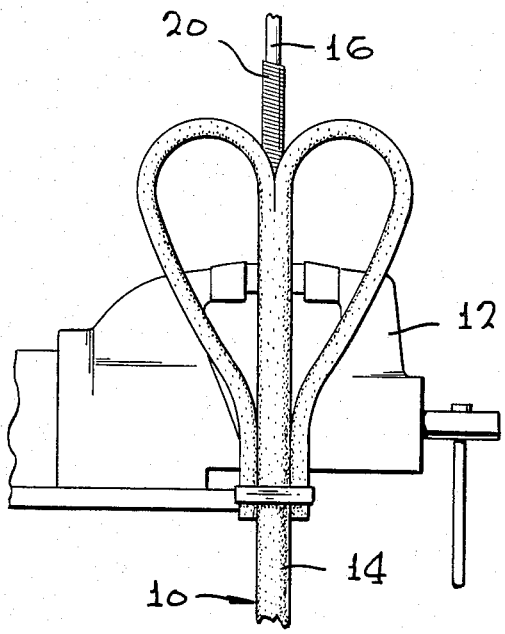
FIG. 1 is a side view of a cable showing the protective polyurethane jacket split and peeled back.

Referring now to FIG. 1, an underwater cable 10 is secured in a vise 12 or other suitable support device. The external polyurethane jacket 14 is split longitudinally into two substantially equal halves and peeled back away from the interior parts of the cable 16. The separated halves may be tied or otherwise secured to the unsplit part of the jacket if of sufficient length. The length of the split halves is determined by the nature of the operations required to effect the desired termination.

Figure 2:
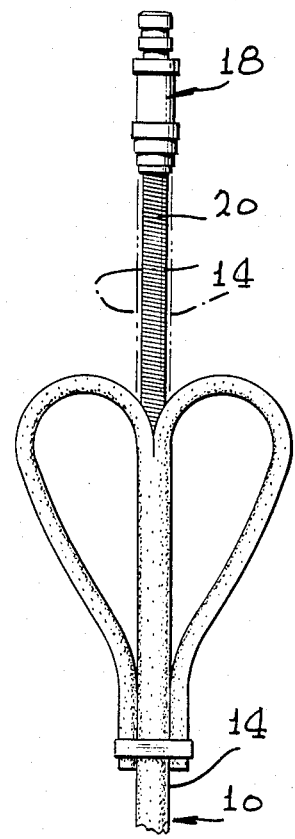
FIG. 2 is a side view similar to FIG. 1 showing the connector and termination member attached to the cable.

A connector and termination member 18 (see FIG. 2) is then fastened to the end of the cable 10 which is exposed by peeling the jacket away. Member 18 may be one of a number of desirable configurations depending upon requirements. It may be of one piece or may include a separate electrical connector member which is wired to the internal conductors of the cable and which is then sealed to a termination member through any suitable means. In the cable illustrated, a spirally wound layer of armor wire 20 is located just inside the jacket 14 and this armor wire is separated into individual strands and fastened to the termination member 18.

When the termination member 18 is suitably attached to the end of the cable, this member and any exposed parts of armor wire 20 are cleaned with trichlorethane or other suitable solvent to remove any residual grease or oil and the cylindrical external surface of the termination member 18 is then primed with a suitable polyurethane to metal bonding agent such as Chemlock 218, available from Lord Corporation, P.O. Box 1099, Erie, Pa. 16512.

Figure 3:
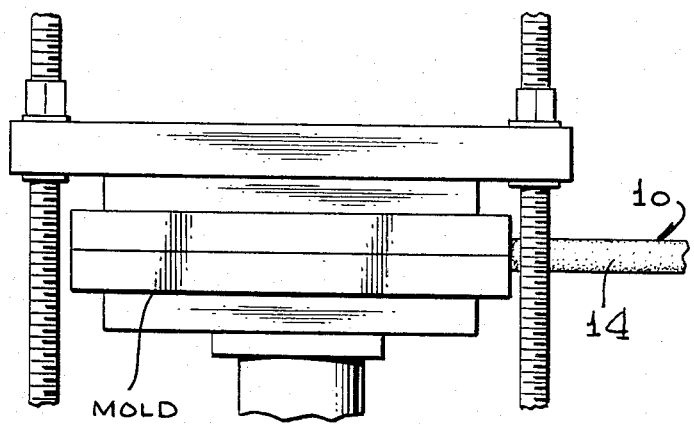
FIG. 3 shows the cable and termination member in the mold.
Figure 4:
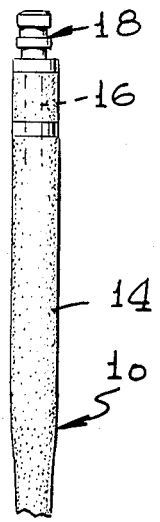
FIG. 4 is a side view of the completed cable termination.

The split halves of the external jacket 14 are then reformed around the cable and over the exterior of the termination member 18 and placed in a mold including sufficient length of cable to include the entire length of the split halves (See FIG. 3). While in the mold, the cable end and termination assembly is subjected to pressure and sufficient heat to cause the polyurethane to flow thus bonding the split halves of the jacket together and causing the jacket to adhere to the metal termination member. The pressure used is only sufficient to clamp the jacket securely while the temperature is maintained at 145-150 degrees C. for approximately 20 minutes to assure that the polyurethane is softened enough to bond together.

When the bonding time has elapsed, the mold is allowed to cool. Preferably, the mold includes cooling channels whereby cold water can circulate through the mold to accelerate the cooling process. When the temperature of the mold has been reduced to less than about 40 degrees C., the termination is removed from the mold, any flashing removed from the jacket and the termination is complete. It has been established that the resulting bonds, that of the polyurethane halves to each other and that of the polyurethane halves to the termination member, are very strong and provide cable terminations at least as reliable as those produced by the more costly and time consuming prior art process discussed above.

I claim:

1. In the manufacture of electrical cables including internal conductors, insulating material protecting said conductors, a protective polyurethane jacket and metallic connector members terminating said cables wherein said connector members must be sealed to said protective polyurethane jacket in such manner as to resist the penetration of an external fluid under high pressure, a method of bonding said jacket to itself and to said connector members comprising the steps of:
   (1) splitting the jacket longitudinally from the end of the cable into two roughly equal halves and peeling the split ends back;
   (2) attaching said metallic connector member to the remaining portion of said cable;
   (3) cleaning the metal surface of said connector member to remove all residual grease or oil;
   (4) priming the external metal surface of said connector member with a thermoplastic adhesive which will adhere to metal and to polyurethane;
   (5) repositioning the split halves of said jacket around said cable and over the surface of said connector member and placing the end of said cable including the length of said split halves and said metallic connector in a mold wherein said mold is in close contact with said jacket;
   (6) applying heat and pressure in said mold in a quantity and for a time sufficient to cause said polyurethane jacket material to flow sufficiently to bond said halves together and to bond said jacket to said metallic connector member; and
   (7) allowing said mold to cool to a temperature substantially below that required to bond said polyurethane jacket material, and removing said cable from said mold.

2. A method of bonding a polyurethane cable jacket to a metallic connector member as set forth in claim 1 wherein said metallic connector member is generally cylindrical and includes an electrical connector connected to said internal conductors and a metallic housing sealed to said electrical connector and to which said jacket is bonded.

3. A method of bonding a polyurethane cable jacket to a metallic connector member as set forth in claim 1 wherein said cable includes armor wires under said jacket, said jacket is split and peeled back sufficiently to permit attachment of said armor wires to said connector member and said wires are cleaned with said connector member.

4. A method of bonding a polyurethane cable jacket to a metallic connector member as set forth in claim 1 wherein said mold includes means for circulating a cooling fluid to cool said mold and said cable to less than about 40 degrees C.

5. A method of bonding a polyurethane cable jacket to a metallic connector member as set forth in claim 1 wherein said mold is heated sufficiently to raise the temperature of said polyurethane jacket material to approximately 145–150 degrees C. and said temperature is maintained for approximately 20 minutes.

6. A method of bonding a polyurethane cable jacket to a metallic connector member as set forth in claim 1 wherein said mold is heated sufficiently to raise the temperature of said polyurethane jacket material to approximately 145–150 degrees C. and said temperature is maintained for approximately 20 minutes, and said mold includes means for circulating cooling water to cool said mold and said cable to less than about 40 degrees C. following the heating process.

* * * * *